United States Patent
Krishnamoorthy

(10) Patent No.: US 11,645,733 B2
(45) Date of Patent: May 9, 2023

(54) SYSTEM AND METHOD FOR PROVIDING ARTIFICIAL INTELLIGENCE ARCHITECTURES TO PEOPLE WITH DISABILITIES

(71) Applicant: Bank of America Corporation, Charlotte, NC (US)

(72) Inventor: Madhusudhanan Krishnamoorthy, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 534 days.

(21) Appl. No.: 16/902,568

(22) Filed: Jun. 16, 2020

(65) Prior Publication Data
US 2021/0390656 A1    Dec. 16, 2021

(51) Int. Cl.
  G06N 3/04     (2023.01)
  G06F 40/58    (2020.01)
  G06N 3/08     (2023.01)
  G06T 3/00     (2006.01)

(52) U.S. Cl.
  CPC ............ *G06T 3/0012* (2013.01); *G06F 40/58* (2020.01); *G06N 3/04* (2013.01); *G06N 3/08* (2013.01); *G06T 2207/20084* (2013.01)

(58) Field of Classification Search
  None
  See application file for complete search history.

(56) References Cited

U.S. PATENT DOCUMENTS

| | | |
|---|---|---|
| 5,586,058 A | 12/1996 | Aloni et al. |
| 5,751,286 A | 5/1998 | Barber et al. |
| 6,154,567 A | 11/2000 | McGarry |
| 6,643,643 B1 | 11/2003 | Lee et al. |
| 6,829,382 B2 | 12/2004 | Lee et al. |
| 6,985,628 B2 | 1/2006 | Fan |
| 6,996,277 B2 | 2/2006 | Fan |

(Continued)

FOREIGN PATENT DOCUMENTS

| | | | |
|---|---|---|---|
| CN | 103942550 B | 7/2014 | |
| CN | 107102948 A | * 8/2017 | .......... G06F 11/3608 |

(Continued)

*Primary Examiner* — Aaron M Richer

(57) ABSTRACT

A system is configured for converting an unstandardized architecture diagram into a braille language diagram is disclosed. The system receives the unstandardized architecture diagram which includes a plurality of architecture components. The system receives a standardized model that includes features to depict the architecture components of the unstandardized architecture diagram in a standard format. The system determines the architecture components, their connections, and their sequences from the unstandardized architecture diagram. The system determines the features to depict the architecture components of the unstandardized architecture diagram in the standard format. The system applies the identified features on the identified architecture components in the unstandardized architecture diagram. The system determines a standardized graphical representation of the unstandardized architecture diagram. The system converts the standardized graphical representation of the unstandardized architecture diagram into a braille language diagram.

20 Claims, 7 Drawing Sheets

(56) References Cited

U.S. PATENT DOCUMENTS

| | | |
|---|---|---|
| 7,991,232 B2 | 8/2011 | Iwamoto |
| 8,199,973 B2 | 6/2012 | Noguchi et al. |
| 8,306,316 B2 | 11/2012 | Kameyama |
| 8,379,994 B2 | 2/2013 | Dai et al. |
| 8,429,168 B1 | 4/2013 | Chechik et al. |
| 8,738,553 B1 | 5/2014 | Leung et al. |
| 8,897,578 B2 | 11/2014 | Huang et al. |
| 9,183,226 B2 | 11/2015 | Yee et al. |
| 9,286,549 B1 | 3/2016 | Ioffe et al. |
| 9,400,918 B2 | 7/2016 | Yin et al. |
| 10,013,636 B2 | 7/2018 | Gan et al. |
| 10,262,244 B2 | 4/2019 | Yamaguchi et al. |
| 10,346,986 B2 | 7/2019 | Xu et al. |
| 10,353,948 B2 | 7/2019 | Perez de la Coba |
| 10,452,995 B2 | 10/2019 | Burger et al. |
| 10,489,678 B2 | 11/2019 | Haas et al. |
| 10,607,119 B2 | 3/2020 | He et al. |
| 10,607,331 B1 | 3/2020 | Tandia et al. |
| 10,628,668 B2 | 4/2020 | Ast |
| 2004/0071346 A1 | 4/2004 | Clark et al. |
| 2006/0140455 A1 | 6/2006 | Costache et al. |
| 2007/0179921 A1 | 8/2007 | Zitnick et al. |
| 2010/0055654 A1 | 3/2010 | Yokono et al. |
| 2010/0313141 A1 | 12/2010 | Yu et al. |
| 2015/0278710 A1 | 10/2015 | Hisada |
| 2015/0347820 A1 | 12/2015 | Yin et al. |
| 2017/0032244 A1 | 2/2017 | Kurata |
| 2017/0153711 A1 | 6/2017 | Dai et al. |
| 2017/0154209 A1 | 6/2017 | Nakano et al. |
| 2017/0316312 A1 | 11/2017 | Goyal et al. |
| 2018/0060760 A1 | 3/2018 | Permeh et al. |
| 2018/0068429 A1 | 3/2018 | Tan et al. |
| 2018/0089593 A1 | 3/2018 | Patel et al. |
| 2018/0268234 A1 | 9/2018 | Yang et al. |
| 2018/0329892 A1 | 11/2018 | Lubbers et al. |
| 2018/0349391 A1 | 12/2018 | Chechik et al. |
| 2019/0012581 A1 | 1/2019 | Honkala et al. |
| 2019/0043193 A1 | 2/2019 | Odaibo et al. |
| 2019/0114547 A1 | 4/2019 | Jaganathan et al. |
| 2019/0130285 A1 | 5/2019 | Snyder et al. |
| 2019/0138554 A1 * | 5/2019 | Remis ................. G06F 16/2237 |
| 2019/0325621 A1 | 10/2019 | Wang et al. |

FOREIGN PATENT DOCUMENTS

| | | | |
|---|---|---|---|
| CN | 111814995 A | * | 10/2020 |
| KR | 20200006384 A | | 1/2020 |
| RU | 2 646 348 C2 | | 3/2018 |
| WO | 2017020140 A1 | | 2/2017 |

* cited by examiner

FIG. 4

Architecture components map 138

| Functions 132-1 | Braille symbols 134-1 |
|---|---|
| Softmax function 132-1a | ◯ 134-1a |
| Word2vec function 132-1b | ◉ 134-1b |
| ... | ... |

| Layers 132-2 | Braille symbols 134-2 |
|---|---|
| Word Embedding layer 132-2a | 134-2a |
| Sentence Embedding layer 132-2b | 134-2b |
| ... | ... |

| Notations 132-3 | Braille symbols 134-3 |
|---|---|
| Ground truth (g) 132-3a | $g_c$ 134-3a |
| Attention weight (U) 132-3b | ✱ 134-3b |
| ... | ... |

| Inputs 132-4 | Braille symbols 134-4 |
|---|---|
| Text inputs (x) 132-4a | —D 134-4a |
| ... | ... |

| Outputs 132-5 | Braille symbols 134-5 |
|---|---|
| Sentiment prediction 132-5a | †† 134-5a |
| ... | ... |

SYSTEM AND METHOD FOR PROVIDING ARTIFICIAL INTELLIGENCE ARCHITECTURES TO PEOPLE WITH DISABILITIES

TECHNICAL FIELD

The present disclosure relates generally to artificial intelligence, and more specifically to a system and method for providing artificial intelligence architectures to people with disabilities.

BACKGROUND

Existing unified markup modeling languages (UMMLs) lack capabilities to represent standardized visualizations for end-to-end artificial intelligence (AI) architectures. The lack of standardized visualizations of end-to-end AI architectures causes inconsistent AI architecture visualizations, which in turn, brings challenges in providing AI architectures to people with disabilities, more specifically, to people with visual disabilities.

SUMMARY

In one embodiment, a system for converting an unstandardized architecture diagram image into a braille language diagram is disclosed. The system is configured to receive the unstandardized architecture diagram image that includes a first layer comprising a first plurality of components. The first plurality of components includes the inputs of an unstandardized architecture diagram in the unstandardized architecture diagram image. The unstandardized architecture diagram image also includes a second layer comprising a second plurality of components. The second plurality of components includes the outputs of the unstandardized architecture diagram. The first layer is connected to the second layer. A plurality of functions operate on the first plurality of components. The system is also configured to receive a standardized model image that includes features to depict the first plurality of components, the second plurality of components, the plurality of functions in a standardized format. The system determines the first layer, the second layer, the plurality of functions, connections between the first layer and the second layer, and a sequence of the first layer and the second layer in the unstandardized architecture diagram image. The system generates a first vector representing the first layer, the second layer, the plurality of functions, the connections between the first layer and the second layer, and the sequence of the first layer and the second layer from the unstandardized architecture diagram image. The system generates a second vector representing the features to depict the first layer, the second layer, the plurality of functions, and the connections between the first layer and the second layer in the standardized format from the standardized model image. The system generates a third vector by applying the features to represent the standardized model from the second vector on the first vector. The system determines a standardized graphical representation of the unstandardized architecture diagram image by changing a dimension of the third vector. The system converts each of the first layer, the second layer, the plurality of functions, the connections between the first layer and the second layer into a corresponding braille symbol.

Previous UMML technologies lack capabilities to represent AI architectures in a unified and standardized visualization. This leads to AI architecture visualizations with inconsistent terminologies, formats, symbols, fonts, colors, etc. The lack of unified and standardized visualization of AI architectures brings challenges in providing the AI architectures to people with disabilities, more specifically to people with visual disabilities. Certain embodiments of this disclosure provide unique solutions to technical problems of previous UMML technologies, including those problems described above. For example, the disclosed system provides several technical advantages, which include: 1) generating unified and standardized visualizations of unstandardized AI architecture diagrams; and 2) converting the unified and standardized visualizations of AI architecture diagrams into braille language diagrams for the visually impaired community to understand and study the AI architecture diagrams. As such, this disclosure may improve the underlying function of UMML technologies by providing the UMML for the unstandardized AI architecture diagrams. Accordingly, the systems described herein may particularly be integrated into a practical application of providing the UMML for the AI architecture diagrams. This, in turn, provides the additional practical application of providing a learning tool for users with visual disabilities to understand and study the AI architecture diagrams.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates examples of AI architecture components mapped with their corresponding braille symbols;

DETAILED DESCRIPTION

Figure 1:
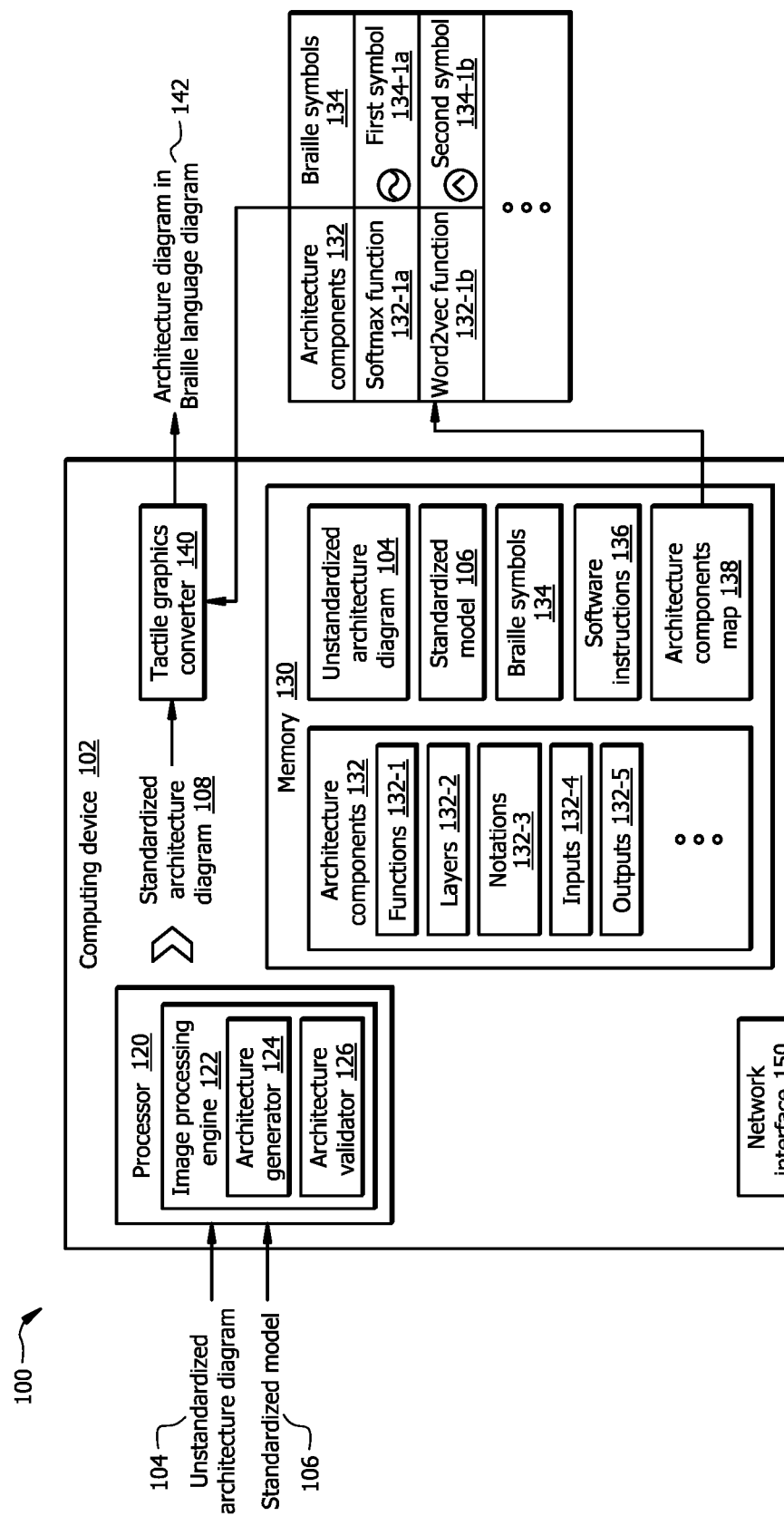
FIG. 1 illustrates one embodiment of a system configured to convert an unstandardized architecture diagram into a braille language diagram.

FIG. 1 illustrates one embodiment of a system 100 configured to convert an unstandardized architecture diagram 104 into a braille language diagram 142. In one embodiment, the system 100 comprises a computing device 102 that includes processor 120 in signal communication with a memory 130 and a network interface 150. Memory 130 includes software instructions 136 that when executed by the processor 120 cause the computing device 102 to perform one or more functions described herein. Memory 130 may also include architecture components map 138 that provides information that may be used by software instructions 136 and/or processor 120. In one embodiment, the processor 120 includes an image processing engine 122. In other embodiments, system 100 may not have all of the components listed and/or may have other elements instead of, or in addition to, those listed above.

In general, the system 100 improves the UMML technology by generating standardized AI architecture diagrams 108 of unstandardized AI architecture diagrams 104 using a machine learning neural network. The system 100 also improves the learning technology for visually impaired users to study and understand AI technologies by converting the standardized AI architecture diagrams 108 into braille language diagrams 142.

Processor 120 comprises one or more processors operably coupled to network interface 150, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 136) to implement image processing engine 122. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-7. For example, the processor 120 may be configured to perform the steps of method 500 as described in FIG. 5.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the unstandardized architecture diagrams 104, standardized model 106, architecture components 132, braille symbols 134, software instructions 136, architecture components map 138, and/or any other data or instructions. The unstandardized architecture diagrams 104, standardized model 106, architecture components 132, braille symbols 134, software instructions 136, and architecture components map 138 may comprise any suitable set of instructions, logic, rules, or code operable to execute the processor 120. The stored unstandardized architecture diagrams 104, standardized model 106, architecture components 132, braille symbols 134, software instructions 136, and architecture components map 138 are described in more detail below.

Network interface 150 is configured to enable wired and/or wireless communications. The network interface 150 is configured to communicate data between the computing device 102 and other devices, systems, or domain(s). For example, the network interface 150 may comprise a WIFI interface, a local area network (LAN) interface, a wide area network (WAN) interface, a modem, a switch, or a router. The processor 120 is configured to send and receive data using the network interface 150. The network interface 150 may be configured to use any suitable type of communication protocol as would be appreciated by one of ordinary skill in the art.

Image Processing Engine

Image processing engine 122 may be implemented using software instructions 136 executed by the processor 120, and is configured to convert an unstandardized architecture diagram 104 into a standardized architecture diagram 108 by using a standardized model 106. In some embodiments, the image processing engine 122 may be implemented by a machine learning neural network including an architecture generator 124 and an architecture validator 126. In some embodiments, the architecture generator 124 and architecture validator 126 may be implemented using software instructions 136 and executed by the processor 120. The architecture generator 124 and architecture validator 126 may include a plurality of machine learning neural networks that are programmed to perform functions described herein. In some embodiments, the architecture generator 124 is configured to extract architecture components 132, connections between the architecture components 132, and a sequence between the architecture generator 124 from the unstandardized architecture diagram 104. In some embodiments, the architecture validator 126 is configured to extract architecture components 132 and connections between the architecture components 132 from the standardized model 106. The image processing engine 122 may receive the unstandardized architecture diagram 104 and standardized model 106, e.g., via an interface including fields and features provided to a user to browse through memory 130 and select the unstandardized architecture diagram 104 and standardized model 106.

Figure 2:
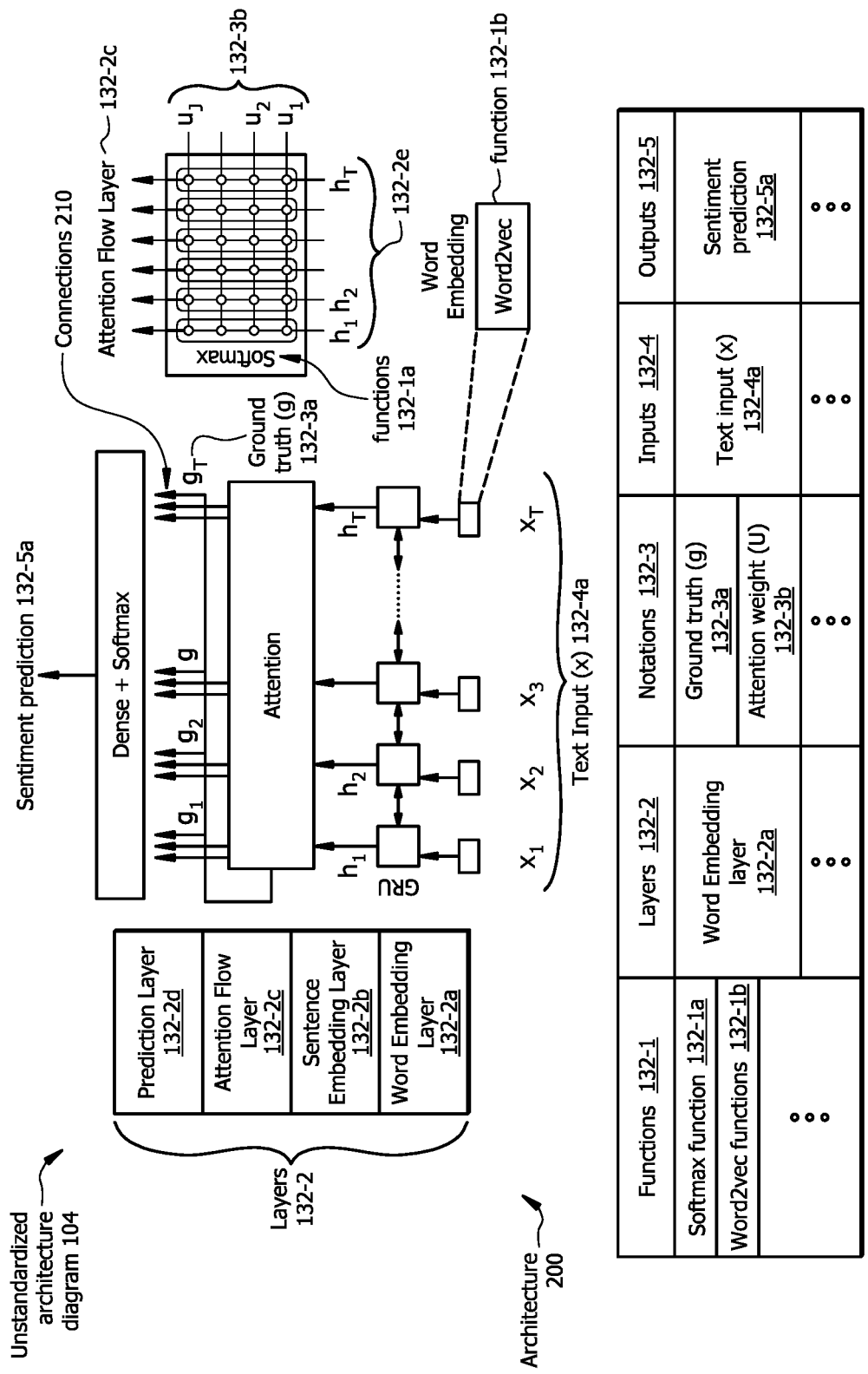
FIG. 2 illustrates an example unstandardized architecture diagram.

FIG. 2 illustrates an example of unstandardized architecture diagram 104. The unstandardized architecture diagram 104 may be any AI, machine learning, and/or deep learning architecture diagram in an image format. As shown in FIG. 2, the unstandardized architecture diagram 104 may include a plurality of architecture components 132 connected via connections 210. The plurality of architecture components 132 may include functions 132-1, layers 132-2, notations 132-3, inputs 132-4, outputs 132-5, etc. A first plurality of functions 132-1 may operate on inputs 132-4 in a first layer 132-2a of the unstandardized architecture diagram 104. Other plurality of functions 132-1 may operate on intermediary components 132 in other layers 132-2. A second plurality of function 132-1 may operate on other intermediary components 132 in the last layer 132-2 to generate outputs 132-5.

In one example, the unstandardized architecture diagram 104 may be a natural language processing (NLP) architecture 200 that is trained to interpret a given text and predict a sentiment of the text, such as, strongly positive, somewhat positive, neutral, somewhat negative, and strongly negative. As illustrated in FIG. 2, in some examples, the functions 132-1 may include a Softmax function 132-1a, Word2vex function 132-1b, etc. In some examples, the layers 132-2 may include a word embedding layer 132-2a, sentence embedding layer 132-2b, etc. In some examples, the notations 132-3 may include Ground truth "(g)" 132-3a, Attention weight "(U)" 132-3b, etc. In some examples, the inputs 132-4 may include Text input (x) 132-4a, etc. In some examples, the outputs 132-5 may include sentiment prediction 132-5a, etc.

In the word embedding layer 132-2a, the words in each sentence of a given text are separated and represented in a vector format using, for example, the Word2Vec function 132-1b. In this process, the syntax and semantics of each sentence are captured in a 2D vector in order to perform mathematical operations performed on them. Word2Vec function 132-1b is a learning algorithm that takes as its input a large corpus of text and produces a vector space, with each unique word in the corpus being assigned a corresponding vector in the space. Word vectors are positioned in the vector space such that words that share common contexts in the corpus are located close to one another in the space. For example, the Word2Vec function 132-1b determines that the relationship between the words "king" and "queen" is the same as the relationship between the words "man" and "woman." In the sentence embedding layer 132-2b, each sentence in the given text is converted into a vector, and relations between the sentences of the given text are determined using a gated recurrent units (GRU) neural network. The GRU neural network is a learning algorithm that determines which words in the text are important to predict the sentiment of the text. For example, the GRU neural network determines that words such as "a," "an," "the", and/or the like are not important and words such as "great," "worst," "brilliant" and/or the like are important to predict the sentiment of the text. In the attention flow layer 132-2c, the information determined in the previous layers are fused and put together, forming an answer, e.g., in a sentence, which is passed on to the prediction layer 132-2d.

Figure 3:
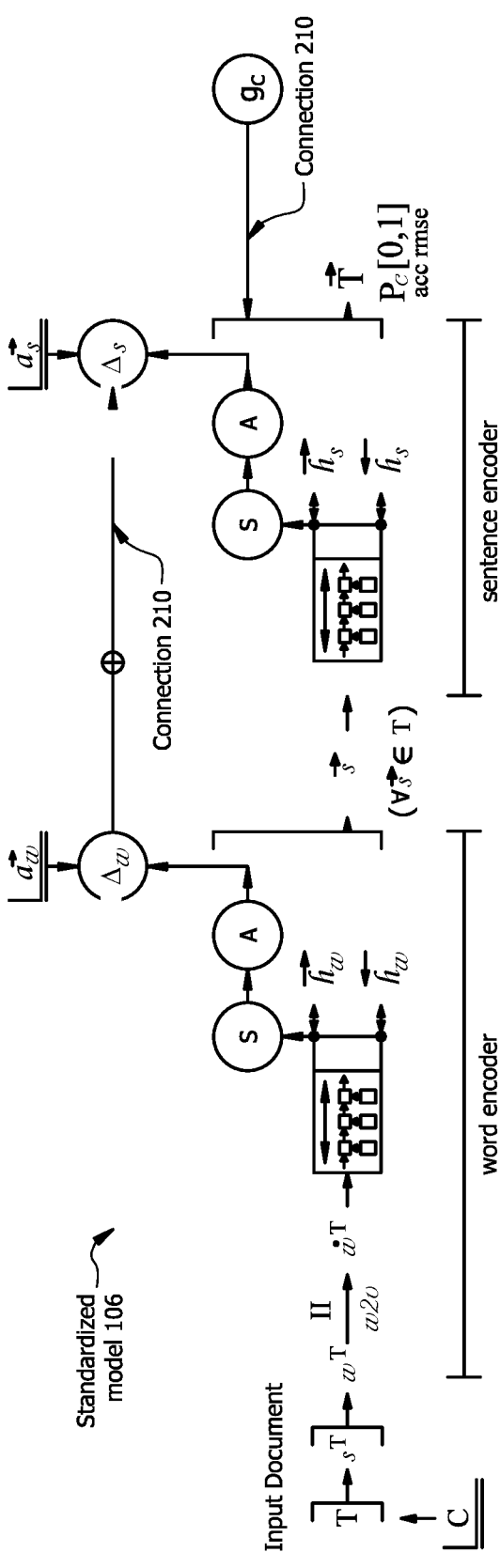
FIG. 3 illustrates an example standardized model.

FIG. 3 illustrates an example standardized model 106 of the example unstandardized architecture diagram 104 illustrated in FIG. 2. The standardized model 106 may include a standardized graphical representation (i.e., the standardized AI UMML) of an unstandardized architecture diagram 104. The standardized model 106 in FIG. 3 may be prepared by a user using a unified modeling language (UML) diagram tool known in the art.

The standardized model 106 may include more details of architecture components 132 such as a label of every function 132-1, layer 132-2, notation 132-3, input 132-4, and output 132-5 used in the unstandardized architecture diagram 104. For example, the standardized model 106 in FIG. 3 include labels of every architecture component 132, whereas the unstandardized architecture diagram 104 in FIG. 2 does not. The standardized model 106 may include features of the architecture components 132 of an unstandardized architecture diagram 104 depicted in a standardized format. The standardized formats of the architecture components 132 of the unstandardized architecture diagram 104 are determined by the user. The standardized model 106 illustrates how the functions 132-1, layers 132-2, notations 132-3, inputs 132-4, outputs 132-5, and connection 210 between the unstandardized architecture diagram 104 should be represented in the standardized format. For example, the standardized model 106 may include features such as shapes, colors, sizes, locations, symbols, texts, etc. of each of the functions 132-1, layers 132-2, notations 132-3, inputs 132-4, outputs 132-5, and connections 210 of the unstandardized architecture diagram 104 in the standardized format. In some examples, the standardized model 106 may include a list of architecture components 132 used in the standardized model 106, such as illustrated in FIG. 3. Each list of architecture components 132 may display the features of the architecture components 132 in the standardized format. For example, the list of functions 132-1 may include how the functions 132-1 should be depicted in the standardized format, such as with a specific name, font, size, symbol, location, etc. of a function 132-1. In some embodiments, standardized features of the layers 132-2 may also include following a specific order in a specific direction, e.g., from left to right, determined by the user. The purpose of the standardized model 106 is to unify the graphical representation of each architecture component 132 of an unstandardized architecture diagram 104.

Referring back to FIG. 1, Architecture generator 124 is implemented using a plurality of neural networks (NNs), convolutional NNs (CNNs), and/or the like, and is configured to generate the standardized architecture diagram 108 from the unstandardized architecture diagram 104 based on the standardized model 106. The architecture generator 124 is used in the implementation of the image processing engine 122, after the image processing engine 122 is trained using an unstandardized architecture diagram dataset comprising a plurality of unstandardized architecture diagrams 104 with their corresponding standardized models 106.

Figure 7:
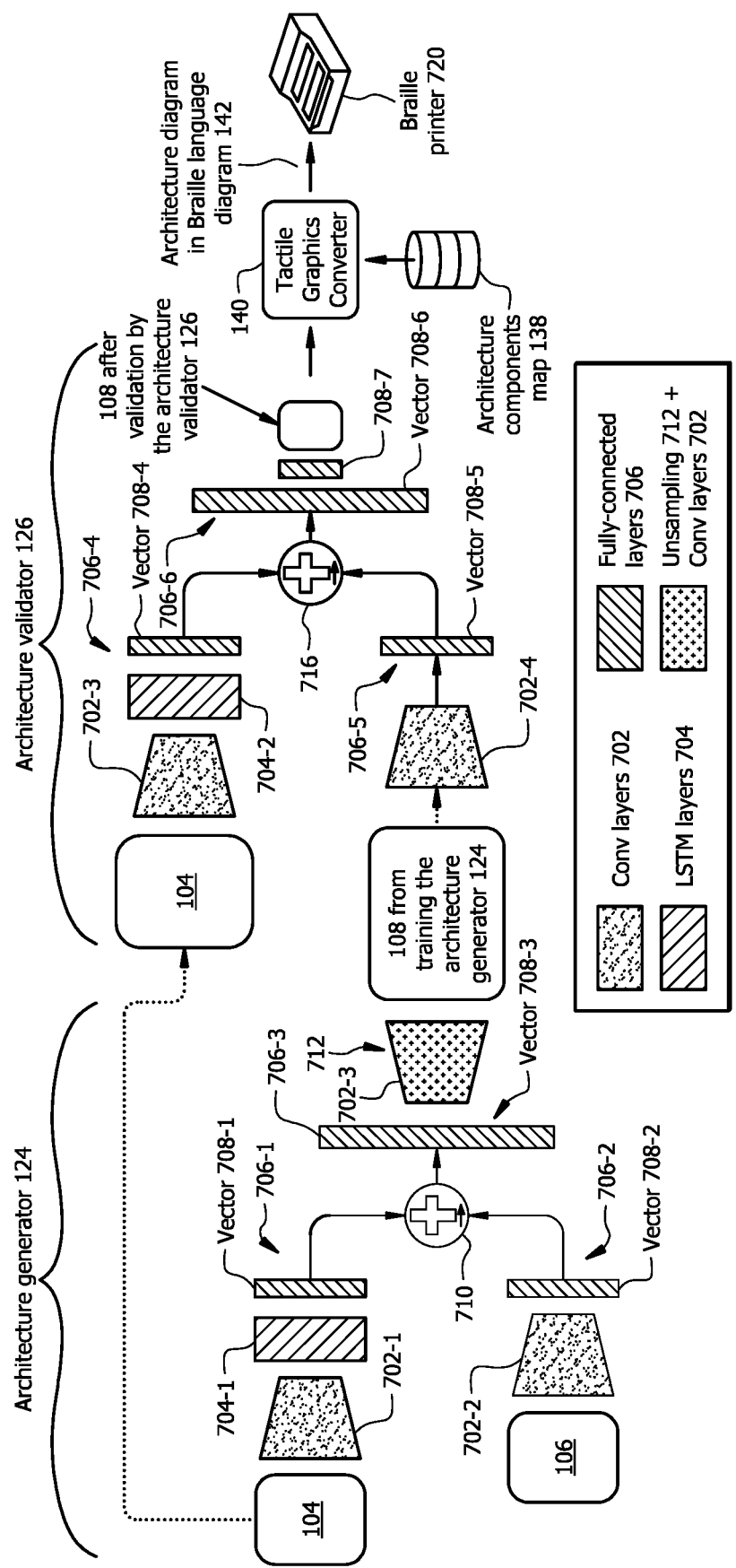
FIG. 7 illustrates one embodiment of an operational flow of the system depicted in FIG. 1.

Architecture validator 126 is implemented using a plurality of NNs, CNNs, and/or the like, and is configured to validate whether the standardized architecture diagram 108 generated by the architecture generator 124 matches the unstandardized architecture diagram 104. In a case where a first generated standardized architecture diagram 108 does not match a first unstandardized architecture diagram 104, the image processing engine 122 performs a back-propagation. In a back-propagation process, the architecture generator 124 adjusts one or more settings to generate a more accurate standardized architecture diagram 108 of the unstandardized architecture diagram 104 based on the standardized model 106. Some examples of the one or more settings may include weights and biases of the neural network layers 132-2 used in the architecture generator 124. The image processing engine 122 is configured to repeat the back-propagation process until the standardized architecture diagram 108 matches the input unstandardized architecture diagram 104. An example of the operation of the image processing engine 122 including the architecture generator 124 and the architecture validator 126 is described in conjunction with the method 500 illustrated in FIG. 5. One embodiment of the image processing engine 122 including the architecture generator 124 and the architecture validator 126 is illustrated in FIG. 7. The embodiment of the image processing engine 122 illustrated in FIG. 7 is for an illustrative purpose and is not meant to limit the scope of the image processing engine 122. In other embodiments, the image processing engine 122 may not have all of the components illustrated in FIG. 7 and/or may have other elements instead of, or in addition to, those illustrated in FIG. 7.

Tactile Graphics Converter

Tactile graphics converter 140 may be implemented using software instructions 136 executed by the processor 120, and is configured to convert the standardized architecture diagram 108 in a braille language diagram 142. In some embodiments, the tactile graphics converter 140 converts each of the architecture components 132 of the standardized architecture diagram 108 following their connections and sequences into their corresponding braille symbol 134 using the architecture components map 138.

The architecture components map 138 includes mapping of the architecture components 132 (e.g., known AI architecture components in the art) with their corresponding braille symbol 134. Some examples of architecture components 132 with their corresponding braille symbols 134 are illustrated in FIG. 4.

FIG. 4 illustrates a non-limiting example of architecture components map 138 including some architecture components 132 with their corresponding braille symbols 134. In some examples of functions 132-1, the Softmax function 132-1a is associated with a braille symbol 134-1a, the Word2vec function 132-1b is associated with a braille symbol 134-1b, etc. In some examples of layers 132-2, the word embedding layer 132-2a is associated with a braille symbol 134-2a, the sentence embedding layer 132-2b is associated with a braille symbol 134-2b, etc. In some examples of notations 132-3, the ground truth (g) 132-3a is associated with a braille symbol 134-3a, the attention weight (U) 132-3b is associated with a braille symbol 134-2b, etc. In some examples of inputs 132-4, the Text inputs (x) 132-4a is associated with a braille symbol 134-4a, etc. In some examples of outputs 132-5, the sentiment prediction 132-5a is associated with a braille symbol 134-5a, etc. In some examples, the architecture components map 138 may include other tables including connections 210 with their corresponding symbols 134, etc.

Referring back to FIG. 1, the tactile graphics converter 140 is configured to identify each architecture component 132 depicted in the standardized architecture diagram 108, e.g., using an image recognition algorithm known in the art. The tactile graphics converter 140 then searches through the architecture components map 138 to find the identified architecture components 132 and fetches their corresponding braille symbol 134. The image recognition algorithm of the tactile graphics converter 140 is previously trained to detect standardized illustrations of the architecture components 132 using a dataset of standardized architecture components 132, such as those architecture components 132 illustrated in FIG. 3. For example, when a standardized architecture diagram 108 includes the Softmax function 132-1a, the tactile graphics converter 140 first identifies the Softmax function 132-1a on the standardized architecture diagram 108 using the image recognition algorithm based on its standardized features such as its shape, color, size, location, symbol, text, etc. The tactile graphics converter 140 then searches through the architecture components map 138, finds the Softmax function 132-1a, and fetches the first braille symbol 134-1a.

Throughout this process, the tactile graphics converter 140 converts the standardized architecture diagram 108 in its entirety into the braille language diagram 142. Once the architecture diagram in braille language diagram 142 is generated, it is passed on to a braille printer 720 to be printed out on a braille paper for a visually impaired user to learn and understand the AI architecture diagrams 104.

Figure 5:
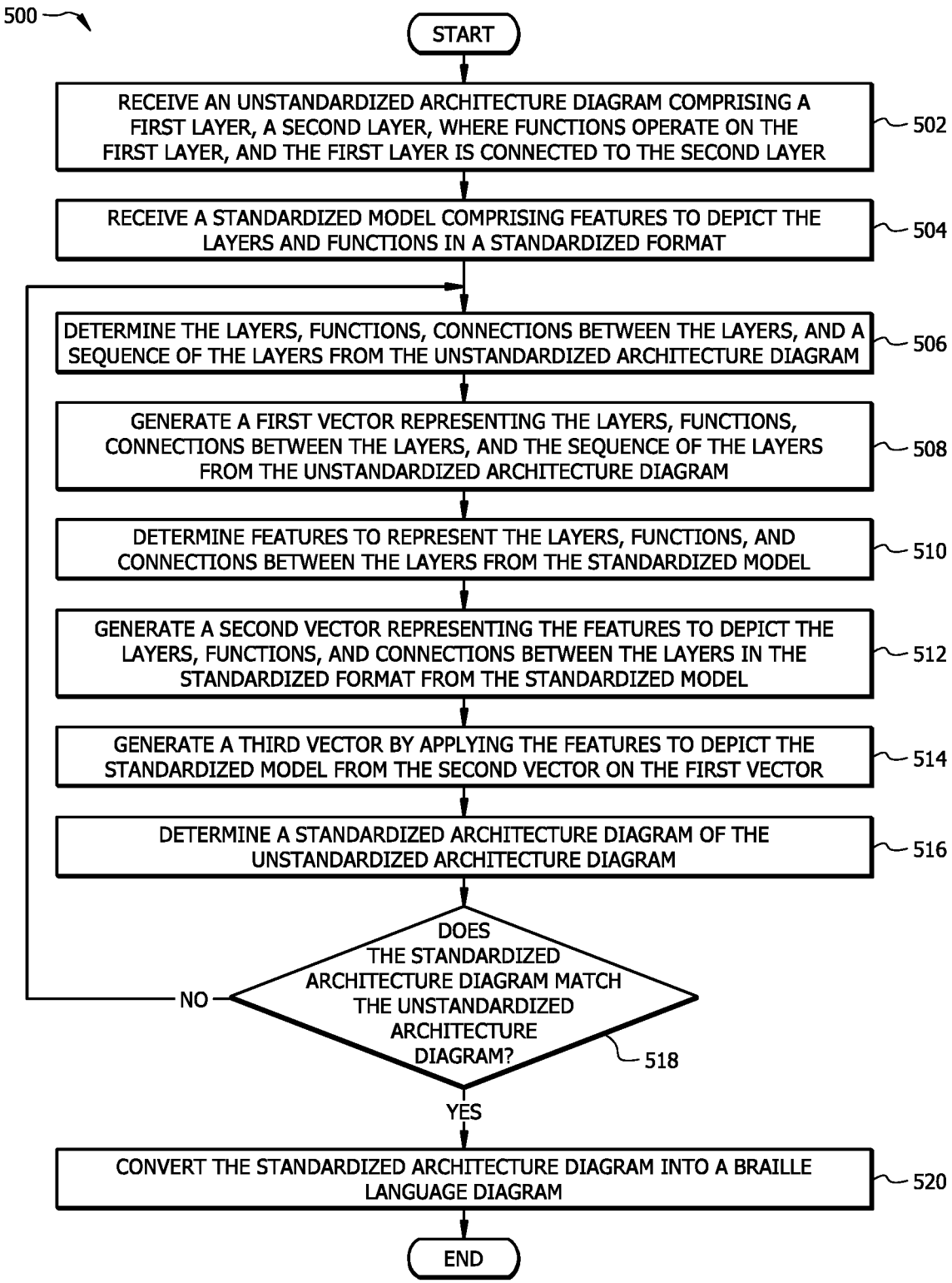
FIG. 5 illustrates an example of a flow chart of a method for converting an unstandardized architecture diagram into a braille language diagram.

FIG. 5 illustrates a flow chart of a method 500 for converting an unstandardized AI architecture diagram 104 into a standardized architecture diagram 108. One or more of steps 502-520 of the method 500 may be implemented, at least in part, in the form of software instructions 136 stored on non-transitory, tangible, machine-readable media (e.g., memory 130) that when run by one or more processors (e.g., processor 120) may cause the one or more processors to perform steps 502-520. In some embodiments, method 500 may be performed on system 100 of FIG. 1, including the computing device 102, processor 120, and tactile graphics converter 140. Aspects of the steps 502-520 of the method 500 have been covered in the description for FIGS. 1-4; and additional aspects are provided below.

The method 500 beings at step 502 where the architecture generator 124 receives an unstandardized architecture diagram 104 in an image format, for example from a user via a user interface of the computing device 102. For example, the user may select the unstandardized architecture diagram 104 from the memory 130 and feed it to the image processing engine 122, e.g., via an interface of the image processing engine 122, as described in FIG. 1. The unstandardized architecture diagram 104 may be any AI architecture diagram, such as the exemplary NLP architecture diagram 200 illustrated in FIG. 2. The unstandardized architecture diagram 104 may include a plurality of architecture components 132, such as functions 132-1, layers 132-2, notations 132-3, inputs 132-4, outputs 132-5, connections 210, etc. as illustrated in FIG. 2.

In step 504, the architecture generator 124 receives a standardized model 106, for example from the user via the user interface of the computing device 102. For example, the user may select the standardized model 106 from the memory 130 and feed it to the image processing engine 122, e.g., via an interface of the image processing engine 122, as described in FIG. 1. The standardized model 106 may include features to represent the architecture components 132 and connections 210 between the architecture components 132 in a standardized format, as described in FIG. 3.

In step 506, the image processing engine 122 (via the architecture generator 124) determines the architecture components 132, the connections 210 between the architecture components 132, and the sequence between the architecture components 132 from the unstandardized architecture diagram 104. In some embodiments, the architecture generator 124 determines the architecture components 132, the connections 210 between the architecture components 132, and the sequence between the architecture components 132 from the unstandardized architecture diagram 104 by performing one or more convolution operations in the convolutional layers 702-1, one or more long short term memory (LSTM) operations in the LSTM layer 704-1, and one or more flattening operations in the fully-connected layer 706-1 as illustrated in FIG. 7.

In this process, the architecture generator 124 first converts the unstandardized architecture diagram 104 into a 2D matrix, where each element of this 2D matrix represent a color value of each pixel of the unstandardized architecture diagram 104, e.g., from 0 to 255, where 0 represent while and 255 represents the black color. The color value of each pixel may be represented by an 8-bit number, hence, covering numbers from 0 to 255. For example, a portion of the 2D matrix representing an input component 132-4, e.g., $x_1$ 132-4a (See FIG. 2) may be, such as:

$$\begin{bmatrix} 255 & 0 & 255 & 0 & 255 \\ 0 & 255 & 0 & 0 & 255 \\ 255 & 0 & 255 & 0 & 255 \end{bmatrix} \quad (1)$$

The 2D matrix representing numerical values for each pixel of the unstandardized architecture diagram 104 may be a dimension n×m, where n is the number of pixels in the height, and m is the number of pixels in the width of the unstandardized architecture diagram 104.

The image processing engine 122 then uses a plurality of filtering matrixes, each with a dimension of, e.g., 3 (height)×3 (width)×1 (depth) and slides them across the width and height of the unstandardized architecture diagram 104, e.g., pixel by pixel. These filtering matrixes are also known as kernels in the art. Each of these filtering matrixes is a 2D matrix with 0s and 1s that are arranged to determine specific shapes, edges, and/or lines across the unstandardized architecture diagram 104. For example, a filtering matrix may be a 2D matrix, such as:

$$\begin{bmatrix} 0 & 0 & 0 \\ 1 & 1 & 1 \\ 0 & 0 & 0 \end{bmatrix} \quad (2)$$

where, 0s and 1s in this particular filtering matrix are arranged to determine the horizontal lines in the unstandardized architecture diagram 104.

In the process of sliding a filtering matrix across the unstandardized architecture diagram 104, the architecture generator 124 determines a product or multiplication of each element of the filtering matrix and the pixels of the unstandardized architecture diagram 104. This process is also known as the convolution operation in a convolutional layer 702 in the art.

In some examples, the filtering matrix is slid across the unstandardized architecture diagram 104 with an n-pixel step, where n is known as a stride of the convolution operation in a convolutional layer 702. For example, consider that a portion of the unstandardized architecture diagram 104 is a 2D matrix representing a set of pixels of the unstandardized architecture diagram 104, such as:

$$\begin{bmatrix} 1 & 3 & 3 & 8 & 4 & 5 \\ 3 & 2 & 4 & 9 & 3 & 4 \\ 254 & 254 & 255 & 254 & 255 & 254 \\ 8 & 4 & 5 & 8 & 4 & 5 \\ 9 & 3 & 4 & 9 & 3 & 4 \\ 255 & 255 & 254 & 255 & 254 & 255 \end{bmatrix} \quad (3)$$

When the filtering matrix (1) illustrated above is slid across the particular portion (3) of the unstandardized architecture diagram 104, and each of elements of the filtering matrix (1) is multiplied by each of the elements of the particular portion (3) of the unstandardized architecture diagram 104, the resulting matrix would extract the horizontal lines (displayed by pixels with black colors) in this portion (3) of the unstandardized architecture diagram 104.

In some examples, the filtering matrixes may include different 2D matrixes for different colors of red, blue, and green (RGB). As such, each 2D filtering matrix may determine shapes, edges, and/or lines in different shades of RGB colors.

In some embodiments, the image processing engine 122 may use different filtering matrixes and perform multiple convolution operations in multiple convolutional layers 702 to determine the architecture components 132 and the connections 210 between them depicted on the unstandardized architecture diagram 104.

Once the architecture components 132 and the connections 210 between the architecture components 132 of the unstandardized architecture diagram 104 are determined, the image processing engine 122 determines the sequence between the architecture components 132 by performing one or more LSTM operations in the LSTM layer 704-1 as illustrated in FIG. 7. The LSTM operation is a type of a recurrent neural network (RNN) known in the art that is used to determine the sequence order between its inputs (herein, the architecture components 132). The LSTM operation may include a learning algorithm capable of learning an order dependence between its inputs by a series of mathematical functions and neural network gates to store the status (or gradient) of earlier inputs while processing later inputs. The purpose of using such neural network gates is to remember the status (or gradient) of the earlier inputs and compare them with the status (or gradient) of the later inputs. With this method, the sequence and relationship between the inputs are determined. The LSTM operation is carried out on the identified architecture components 132 and their connections represented in the 2D matrix after performing the convolution operations in the convolution layer 702-1 discussed above.

In this process, the architecture generator 124 iterate through the identified architecture components 132 and learns their order of occurrence in the unstandardized architecture diagram 104 by storing their status (or gradients) in neural network gates. In some embodiments, the architecture generator 124 may use one or more of other types of RNNs known in the art, such as a gated recurrent units (GRU) neural network, bi-directional LSTM (BiLSTM), etc. to determine the sequence between the architecture components 132 of the unstandardized architecture diagram 104.

At this stage of the operation, the architecture generator 124 has generated a 2D matrix representing the architecture components 132, the connections between the architecture components 132, and the sequence between the architecture components 132.

In step 508, the architecture generator 124 determines a 1D matrix or a first vector 708-1 representing the architecture components 132, the connections between the architecture components 132, and the sequence between the architecture components 132 in the fully-connected layer 706-1. In this process, the architecture generator 124 performs a flattening operation on the generated 2D matrix to convert it into a 1D matrix. The flattening operation is performed in the full-connected layer 706-1, by which the elements in the generated 2D matrix are arranged in one row. For example, a portion of the 2D matrix generated from the LSTM operation in the LSTM layer 704-1 discussed above may be, such as:

$$\begin{bmatrix} 1 & 2 & 3 \\ 4 & 5 & 6 \\ 7 & 8 & 9 \end{bmatrix} \quad (4)$$

After performing the flattening operation, this portion of the 2D matrix, may be:

$$[1\ 2\ 3\ 4\ 5\ 6\ 7\ 8\ 9] \quad (5)$$

The 1D matrix or first vector 708-1 represents a mathematical representation of the architecture components 132, the connections between the architecture components 132, and the sequence between the architecture components 132.

In step 510, the architecture generator 124 determines the features to depict the architecture components 132 and the connections between the architecture components 132 in the standardized format from the standardized model 106, e.g., by performing one or more convolution operations in the convolutional layer 702-2 as illustrated in FIG. 7. In this process, the architecture generator 124 may perform the one or more convolution operations on the standardized model 106 similar to the convolution operation performed on the unstandardized architecture diagram 104 in the convolutional layer 702-1 described in step 506.

At the end of this process, the image processing engine 122 generates a 2D matrix representing the features to depict the architecture components 132 and the connections between the architecture components 132 in the standardized format determined by the user. In some examples, the features to depict the architecture components 132 and the connections between the architecture components 132 in the standardized format may include features such as shapes, colors, sizes, locations, symbols, texts, etc. of architecture components 132 and the connections between the architecture components 132 as described in FIG. 3.

In step 512, the architecture generator 124 determines a 1D matrix or a second vector 708-2 representing the features to depict the architecture components 132 and the connections between the architecture components 132 in the fully-connected layer 706-2. In this process, the architecture generator 124 may perform a flattening operation on the 2D matrix generated from the one or more convolution operations in the convolutional layer 702-2 performed in step 510 similar to the flattening operation performed in the fully-connected layer 706-1 described in step 508.

In step 514, the architecture generator 124 applies the features to depict the standardized model 106 from the second vector 708-2 on the first vector 708-1, generating a third vector 708-3, e.g., by performing a combination operation 710. In this process, the architecture generator 124 fuses or combines the architecture components 132 identified in the first vector 708-1 and the features to depict the architecture components 132 in the standard format identified in the second vector 708-2. In some embodiments, the combination operation 710 may include a concatenation operation.

The first vector 708-1 may include a plurality of numerical representations indicating the architecture components 132, their connections, and the order of sequences as they are depicted in the unstandardized architecture diagram 104. The second vector 708-2 may include a plurality of numerical representations indicating the architecture components 132 in the standardized format, such as in form of corresponding features such as shapes, colors, sizes, locations, symbols, texts, etc. as described in FIG. 3. For example, consider that a first portion of the first vector 708-1 may include numeral representations of the Word2vec function 132-1b. (See FIG. 2.) Also consider that the first portion of the second vector 708-2 may include numeral representations of features to depict the Word2vec function 132-1b with the specific symbol of "w2v" and the specific font, size, color, etc. as described in FIG. 3. In this particular example, the architecture generator 124 determines that the standardized format of illustrating the Word2vec function 132-1b is to depict it with the specific symbol of "w2v" with the specific features as represented in the second vector 708-2. Thus, the architecture generator 124 applies these specific features on the Word2vec function 132-1b to be depicted with such features in the standardized architecture diagram 108.

Similarly, the architecture generator 124 may apply the features of illustrating the architecture components 132 and their connections following in the identified order in the standardized format from the second vector 708-2 on the architecture components 132 and their connections following in the identified order in the first vector 708-1. Thereby generating a 1D matrix or a third vector 708-3 which includes numerical representations of the standardized architecture diagram 108 arranged in one row.

In step 516, the architecture generator 124 determines the standardized architecture diagram 108 (i.e., the standardized UMML diagram) of the unstandardized architecture diagram 104. In this process, the architecture generator 124 generates the standardized architecture diagram 108, e.g., by performing a convolution operation in the convolutional layer 702-3 following with an upsampling operation 712. Here, the architecture generator 124 (via the convolution operation in the convolutional layer 702-3) converts the 1D matrix or the third vector 708-3 into a 2D matrix in which each element represents a pixel numerical value of the standardized architecture diagram 108 to be depicted in a form of an image. In some embodiments, this 2D matrix may have a different size based on the sizes of the architecture components 132 depicted on the unstandardized architecture diagram 104 and the sizes of architecture components 132 in the standardized format in the standardized model 106. Thus, the upsampling operation 712 may be used to unify the size of the standardized architecture diagram 108.

The upsampling operation 712 may include a mathematical operation that sets the size of the standardized architecture diagram 108, for example, to be the same size as the size of the standardized model 106, such as, a 5-inch×6-inch size image. In some embodiments, the architecture generator 124 (via the upsampling operation 712) sets the size of the standardized architecture diagram 108 such that architecture components 132 and their connections depicted in the standardized architecture diagram 108 are identifiable to a user with a reasonable eyesight. For example, the upsampling operation 712 may scale up the size of the standardized architecture diagram 108 by replicating neighboring pixel numerical values. In one example, consider that a portion of the 2D matrix representing a portion of the standardized architecture diagram 108 may be, such as:

$$\begin{bmatrix} 1 & 2 \\ 3 & 4 \end{bmatrix} \quad (6)$$

The upsampling operation 712 may replicate each element in the matrix (6), such as:

$$\begin{bmatrix} 1 & 1 & 2 & 2 \\ 1 & 1 & 2 & 2 \\ 3 & 3 & 4 & 4 \\ 3 & 3 & 4 & 4 \end{bmatrix} \quad (7)$$

At the end of this stage, the result is the standardized architecture diagram 108, e.g., with a specific size, from training the architecture generator 124 to generate the standardized architecture diagram 108 by applying the extracted standardized features from the standardized model 106 on the unstandardized architecture diagram 104.

In step 518, the image processing engine 122 determines whether the standardized architecture diagram 108 generated from the architecture generator 124 matches the unstandardized architecture diagram 104. In one embodiment, step 518 is performed in a training phase of the image processing engine 122. In this process, the architecture validator 126 compares the unstandardized architecture diagram 104 and the standardized architecture diagram 108 generated from the architecture generator 124. If the image processing engine 122 determines that the unstandardized architecture diagram 104 does not match the standardized architecture diagram 108 generated from the architecture validator 126, the method 500 returns to step 506. In this case, the image processing engine 122 performs a back-propagation. (described in FIG. 1) In the back-propagation process, one or more settings (such as weighs and biases) in the convolutional layers 702, the LSTM layers 704, the fully-connected layers 706, and/or combination operation 710 are modified until the unstandardized architecture diagram 104 matches the standardized architecture diagram 108 generated from the architecture validator 126. If the image processing engine 122 determines that the unstandardized architecture diagram 104 matches the standardized architecture diagram 108 generated from the architecture validator 126, the method 500 proceeds to step 520.

Throughout this process, the architecture validator 126 determines the architecture components 132, their connections, and their sequences from the unstandardized architecture diagram 104, e.g., by performing at least one of each of convolution operations, LSTM operations, and flattening operations, in the convolutional layer 702-3, LSTM layer 704-2, and fully-connected layer 706-4, respectively, as illustrated in FIG. 7. By the end of these operations, the architecture validator 126 generates a fourth vector or a 1D matrix 708-4 which represents the architecture components 132, their connections, and their sequences from the unstandardized architecture diagram 104.

At the same time, the architecture validator 126 determines the architecture components 132 and their connections from the standardized architecture diagram 108, e.g., by performing one or more convolution operations in the convolutional layer 702-4 similar to the convolution operations described in step 506. By the end of this operation, the architecture validator 126 generates a fifth vector or a 1D matrix 708-5 which represents the architecture components 132, their connections, and their sequence from the standardized architecture diagram 108 from training the architecture generator 124. Then, the architecture validator 126 compares the matrixes 708-4 and 708-5, e.g., by performing a comparison operation 716 on every element of the matrix 708-4 and its corresponding element in the matrix 708-5.

If a first set of elements from the matrix 708-4 matches its corresponding first set of elements from the matrix 708-5, the average result from performing the comparison operations 716 on these two sets of elements will be 1, meaning that these elements have represent a same architecture component 132. If, however, a set of elements from the matrix 708-4 does not match its corresponding set of elements from the matrix 708-5, the average result from performing the comparison operations 716 on these two sets of elements will be less than 1, meaning that these sets of elements do not represent a same architecture component 132. In some embodiments, the architecture validator 126 may determine that small differences in elements from the matrixes 708-4 and 708-5 are tolerable as determined by the user. For example, if a difference between a first element from the matrix 708-4 and its corresponding element from matrix 708-5 is less than 5%, the architecture validator 126 may determine that result from performing the comparison operation 716 on these two elements may be considered as 1.

Similarly, the architecture validator 126 may perform the comparison operations 716 on different portions of the matrixes 708-4 and 708-5 that include sets of elements representing different architecture components 132 to determine whether an architecture component 132 from the matrix 708-4 matches the corresponding architecture component 132 in the standard format from the matrix 708-5. In some embodiments, the architecture validator 126 may take the average values from performing the comparison operations 716 on different portions of the matrixes 708-4 and 708-5.

For example, consider that a first portion of the matrix 708-4 includes elements representing a first layer 132-2*a* in the unstandardized architecture diagram 104 titled "Word embedding layer." (See FIG. 2.) Also consider that a first portion of the matrix 708-5 includes elements representing a first layer 132-2*a* in the standardized architecture diagram 108 titled "Word embedding layer" with the specific features such as a symbol, font, size, color, etc. as illustrated in the standardized model 106. (See FIG. 3.) Thus, the average result from performing the comparison operations 716 on these two portions from matrixes 708-4 and 708-5 will be 1, meaning that the first layer 132-2*a* is titled correctly and illustrated in the standard format in the standardized architecture diagram 108.

In another example, consider that the first portion of the matrix 708-4 includes elements representing the first layer 132-2*a* in the unstandardized architecture diagram 104 titled "Word embedding layer." Also consider that a first portion of the matrix 708-5 includes elements representing a first layer 132-2*a* in the standardized architecture diagram 108 is titled "Word emb layer" with the specific features such as a symbol, font, size, color, etc. as illustrated in the standardized model 106. Thus, the average result from performing the comparison operations 716 on these two portions from matrixes 708-4 and 708-5 will be less than, e.g., 0.95 because the first layer 132-2*a* in the matrix 708-5 is missing more than one character. In this case, the image processing engine 122 determines that the first layer 132-2*a* in the matrix 708-5 is not titled correctly and performs a back-propagation (described in FIG. 1) to change one or more settings to generate a more accurate the standardized architecture diagram 108.

In another example, consider that the first portion of the matrix 708-4 includes elements representing the first layer 132-2*a* in the unstandardized architecture diagram 104 titled "Word embedding layer." Also consider that a first portion of the matrix 708-5 includes elements representing the first layer 132-2*a* in the unstandardized architecture diagram 104 titled "Word embedding layer" with at least one of a symbol, font, size, color, etc. other than as specified in the standardized model 106. Thus, the average result from performing the comparison operations 716 on these two portions from matrixes 708-4 and 708-5 will be less than, e.g., 0.95 because the first layer 132-2*a* in the matrix 708-5 is not standardized based on the standard features as specified in the standardized model 106.

In another example, consider that a second portion of the matrix 708-4 includes elements representing that the first layer 132-2*a* is connected to the second layer 132-2*b*, and the second layer 132-2*b* is connected to the third layer 132-2*c* in the unstandardized architecture diagram 104. Also, consider that a first portion of the matrix 708-5 includes elements representing that the first layer 132-2*a* is connected to the third layer 132-2*c* in the standardized architecture diagram 108 (due to inaccurate settings in the architecture generator 124). Thus, the average result from performing the comparison operations 716 on these two portions from matrixes 708-4 and 708-5 will be less than, e.g., 0.95 because the matrix 708-5 is missing the second layer 132-2*b*, and consequently the layers 132-2 in the matrixes 708-4 and 708-5 do not match.

In some embodiments, the architecture validator 126 may determine that the matrix 708-4 matches the matrix 708-5, if the total average value from the comparison operations 716 is higher than, e.g., 0.95, meaning that 95% of the elements from the matrix 708-4 match their corresponding elements from the matrix 708-5. If the architecture validator 126 determines that the matrix 708-4 matches the matrix 708-5, it proceeds to generate a sixth vector or a 1D matrix 708-6 which includes numerical elements representing the combination of the architecture components 132, their connections, and their sequences from the matrix 708-4 with the standardized illustrations of the architecture components 132 and their connections from the matrix 708-5. The architecture validator 126 may then perform a 1D to 2D conversion to change the dimension of the matrix 708-6 from 1D to 2D to generate a 2D matrix 708-7 which elements are the numerical values of the pixels of the final standardized architecture diagram 108 as illustrated in FIG. 6.

Figure 6:
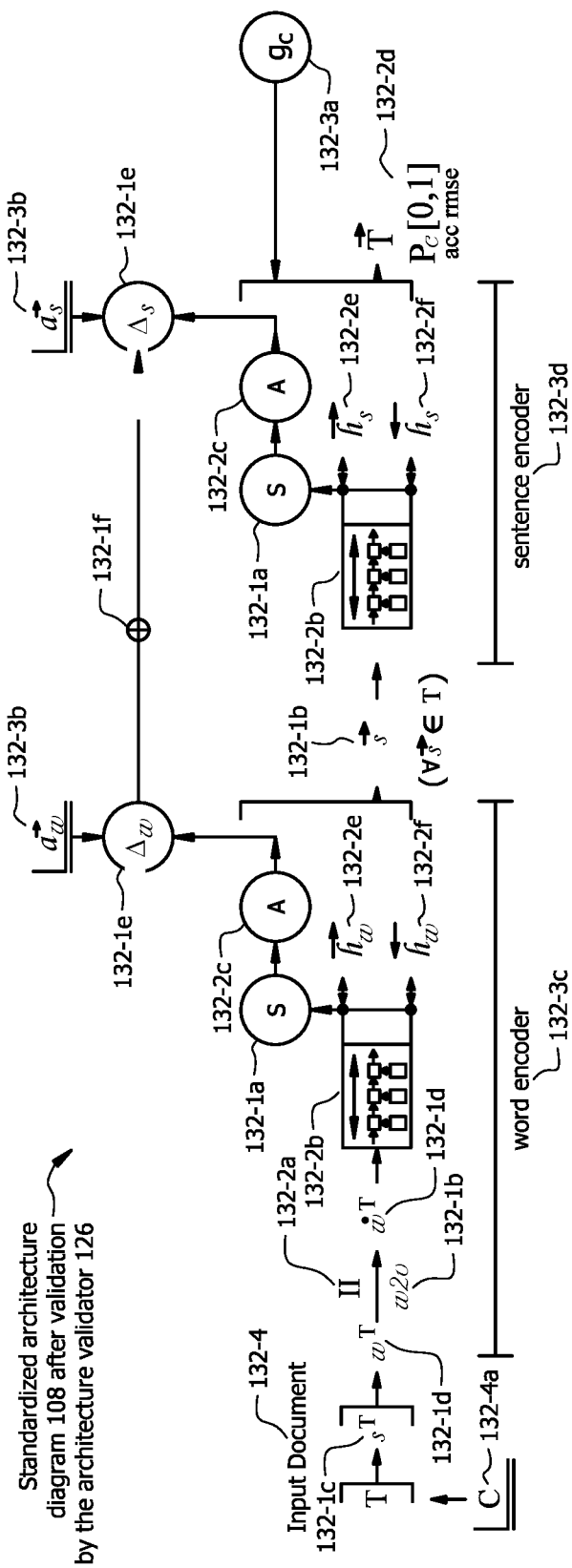
FIG. 6 illustrates an example standardized architecture diagram.

FIG. 6 illustrates the final standardized architecture diagram 108 generated from the image processing engine 122 after it is validated by the architecture validator 126. For example unstandardized architecture diagram 104 in FIG. 2 and example standardized model 106 in FIG. 3, the example standardized architecture diagram 108 may be an image illustrated in FIG. 6. The standardized architecture diagram 108 may include architecture components 132 of the unstandardized architecture diagram 104 depicted in the standardized format with their connections as illustrated in the standardized model 106. The architecture components 132 in the standardized architecture diagram 108 follows the sequence of the architecture components 132 extracted from the standardized model 106.

Referring back to FIG. 5, in step 520, the tactile graphics converter 140 converts the standardized architecture diagram 108 including its architecture components 132, their connections, and their sequences into a braille language diagram 142 the architecture components map 138 as described in FIG. 1. Once the standardized architecture diagram 108 is converted into the braille language diagram 142, it is passed on to the braille printer 720 to print the standardized architecture diagram 108 in braille language diagram 142 on a braille paper for visually impaired users to study and learn the unstandardized AI architecture diagram 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for converting an unstandardized architecture diagram image into a braille language diagram, comprising:
   a memory operable to store the unstandardized architecture diagram image;
   a processor operably coupled to the memory and configured to:
      receive the unstandardized architecture diagram image, comprising:
         a first layer that comprises a first plurality of components, wherein the first plurality of components includes inputs of an unstandardized architecture diagram in the unstandardized architecture diagram image; and
         a second layer that comprises a second plurality of components, wherein:
            the second plurality of components include outputs of the unstandardized architecture diagram;
            a plurality of functions operates on the first plurality of components; and
            the first layer is connected to the second layer;
      receive a standardized model image that comprises features to depict the first plurality of components, the second plurality of components, and the plurality of functions in a standardized format;
      determine the first layer, the second layer, the plurality of functions, connections between the first layer and the second layer, and a sequence of the first layer and the second layer in the unstandardized architecture diagram image;
      generate a first vector representing the first layer, the second layer, the plurality of functions, the connections between the first layer and the second layer, and the sequence of the first layer and the second layer from the unstandardized architecture diagram image;
      determine features to represent the first layer, the second layer, the plurality of functions, and the connections between the first layer and the second layer in the standardized model image;
      generate a second vector representing the features to depict the first layer, the second layer, the plurality of functions, and the connections between the first layer and the second layer in the standardized format from the standardized model image;
      generate a third vector by applying the features to depict the standardized model image from the second vector on the first vector;
      determine a standardized graphical representation of the unstandardized architecture diagram image by changing a dimension of the third vector;
      based on the standardized graphical representation of the unstandardized architecture diagram image, convert each of the first layer, the second layer, the plurality of functions, the connections between the first layer and the second layer into a corresponding braille symbol.

2. The system of claim 1, wherein determining the first layer, the second layer, the plurality of functions, the connections between the first layer and the second layer, and a sequence of the first layer and the second layer in the unstandardized architecture diagram image comprises:
   determining the first layer, the second layer, the plurality of functions, and the connections between the first layer and the second layer in the unstandardized architecture diagram image by performing a convolution operation on the unstandardized architecture diagram image;

generating a first matrix representing the first layer, the second layer, the plurality of functions, and the connections between the first layer and the second layer in the unstandardized architecture diagram image;

determining the sequence of the first layer and the second layer of the unstandardized architecture diagram image by performing a long short term memory (LSTM) operation on the first matrix;

generating a second matrix representing the first layer, the second layer, the plurality of functions, the connections between the first layer and the second layer, and the sequence of the first layer and the second layer in the unstandardized architecture diagram image; and performing a flattening operation on the second matrix to generate the first vector.

3. The system of claim 1, wherein determining features to depict the first layer, the second layer, the plurality of functions, and the connections between the first layer and the second layer in the standardized model image comprises:

determining the first layer, the second layer, the plurality of functions, and the connections between the first layer and the second layer in the standardized model image by performing a convolution operation on the standardized model image;

generating a third matrix representing the first layer, the second layer, the plurality of functions, and the connections between the first layer and the second layer in the unstandardized architecture diagram image;

performing a flattening operation on the third matrix to generate the second vector.

4. The system of claim 1, wherein determining the standardized graphical representation of the unstandardized architecture diagram image comprises:

performing a convolution with an upsampling operation on the third vector, wherein the upsampling operation unifies a size of the standardized graphical representation of the unstandardized architecture diagram image.

5. The system of claim 1, wherein the standardized graphical representation comprises:

a first standardized layer comprising the first plurality of components depicted in a standardized format; and a second standardized layer comprising the second plurality of components depicted in a standardized format, wherein the plurality of functions is operated on the first plurality of components, the first standardized layer is connected to the second standardized layer.

6. The system of claim 1, wherein converting the plurality of functions into a corresponding braille symbol comprises:

converting a first function into a first braille symbol using a mapping of functions to braille symbols stored in the memory; and converting a second function into a second braille symbol different from the first braille symbol using the mapping of functions to braille symbols.

7. The system of claim 6, wherein converting the first layer and the second layer into a corresponding braille symbol comprises:

converting the first layer into a third braille symbol using a mapping of layers to braille symbols stored in the memory; and converting the second layer into a fourth braille symbol using a mapping of layers to braille symbols.

8. A method for converting an unstandardized architecture diagram image into a braille language diagram, comprising:

receiving the unstandardized architecture diagram image, comprising:

a first layer that comprises a first plurality of components, wherein the first plurality of components includes inputs of an unstandardized architecture diagram in the unstandardized architecture diagram image; and a second layer that comprises a second plurality of components, wherein:

the second plurality of components include outputs of the unstandardized architecture diagram;

a plurality of functions operates on the first plurality of components; and the first layer is connected to the second layer;

receiving a standardized model image that comprises features to depict the first plurality of components, the second plurality of components, and the plurality of functions in a standardized format;

determining the first layer, the second layer, the plurality of functions, connections between the first layer and the second layer, and a sequence of the first layer and the second layer in the unstandardized architecture diagram image;

generating a first vector representing the first layer, the second layer, the plurality of functions, the connections between the first layer and the second layer, and the sequence of the first layer and the second layer from the unstandardized architecture diagram image;

determining features to represent the first layer, the second layer, the plurality of functions, and the connections between the first layer and the second layer in the standardized model image;

generating a second vector representing the features to depict the first layer, the second layer, the plurality of functions, and the connections between the first layer and the second layer in the standardized format from the standardized model image;

generating a third vector by applying the features to depict the standardized model image from the second vector on the first vector;

determining a standardized graphical representation of the unstandardized architecture diagram image by changing a dimension of the third vector;

based on the standardized graphical representation of the unstandardized architecture diagram image, converting each of the first layer, the second layer, the plurality of functions, the connections between the first layer and the second layer into a corresponding braille symbol.

9. The method of claim 8, wherein determining the first layer, the second layer, the plurality of functions, the connections between the first layer and the second layer, and a sequence of the first layer and the second layer in the unstandardized architecture diagram image comprises:

determining the first layer, the second layer, the plurality of functions, and the connections between the first layer and the second layer in the unstandardized architecture diagram image by performing a convolution operation on the unstandardized architecture diagram image;

generating a first matrix representing the first layer, the second layer, the plurality of functions, and the connections between the first layer and the second layer in the unstandardized architecture diagram image;

determining the sequence of the first layer and the second layer of the unstandardized architecture diagram image by performing a long short term memory (LSTM) operation on the first matrix;

generating a second matrix representing the first layer, the second layer, the plurality of functions, the connections between the first layer and the second layer, and the sequence of the first layer and the second layer in the unstandardized architecture diagram image; and performing a flattening operation on the second matrix to generate the first vector.

10. The method of claim 8, wherein determining features to depict the first layer, the second layer, the plurality of functions, and the connections between the first layer and the second layer in the standardized model image comprises:

determining the first layer, the second layer, the plurality of functions, and the connections between the first layer and the second layer in the standardized model image by performing a convolution operation on the standardized model image;

generating a third matrix representing the first layer, the second layer, the plurality of functions, and the connections between the first layer and the second layer in the unstandardized architecture diagram image;

performing a flattening operation on the third matrix to generate the second vector.

11. The method of claim 8, wherein determining the standardized graphical representation of the unstandardized architecture diagram image comprises:

performing a convolution with an upsampling operation on the third vector, wherein the upsampling operation unifies a size of the standardized graphical representation of the unstandardized architecture diagram image.

12. The method of claim 8, wherein the standardized graphical representation comprises:

a first standardized layer comprising the first plurality of components depicted in a standardized format; and a second standardized layer comprising the second plurality of components depicted in a standardized format, wherein the plurality of functions is operated on the first plurality of components, the first standardized layer is connected to the second standardized layer.

13. The method of claim 8, wherein converting the plurality of functions into a corresponding braille symbol comprises:

converting a first function into a first braille symbol using a mapping of functions to braille symbols stored in a memory; and converting a second function into a second braille symbol different from the first braille symbol using the mapping of functions to braille symbols.

14. The method of claim 8, wherein converting the first layer and the second layer into a corresponding braille symbol comprises:

converting the first layer into a third braille symbol using a mapping of layers to braille symbols stored in a memory; and converting the second layer into a fourth braille symbol using a mapping of layers to braille symbols.

15. A computer program comprising executable instructions stored in a non-transitory computer-readable medium that when executed by a processor causes the processor to:

receive an unstandardized architecture diagram image, comprising:

a first layer that comprises a first plurality of components, wherein the first plurality of components includes inputs of an unstandardized architecture diagram in the unstandardized architecture diagram image; and a second layer that comprises a second plurality of components, wherein:

the second plurality of components include outputs of the unstandardized architecture diagram;

a plurality of functions operates on the first plurality of components; and the first layer is connected to the second layer;

receive a standardized model image that comprises features to depict the first plurality of components, the second plurality of components, and the plurality of functions in a standardized format;

determine the first layer, the second layer, the plurality of functions, connections between the first layer and the second layer, and a sequence of the first layer and the second layer in the unstandardized architecture diagram image;

generate a first vector representing the first layer, the second layer, the plurality of functions, the connections between the first layer and the second layer, and the sequence of the first layer and the second layer from the unstandardized architecture diagram image;

determine features to represent the first layer, the second layer, the plurality of functions, and the connections between the first layer and the second layer in the standardized model image;

generate a second vector representing the features to depict the first layer, the second layer, the plurality of functions, and the connections between the first layer and the second layer in the standardized format from the standardized model image;

generate a third vector by applying the features to depict the standardized model image from the second vector on the first vector;

determine a standardized graphical representation of the unstandardized architecture diagram image by changing a dimension of the third vector;

based on the standardized graphical representation of the unstandardized architecture diagram image, convert each of the first layer, the second layer, the plurality of functions, the connections between the first layer and the second layer into a corresponding braille symbol.

16. The computer program of claim 15, wherein determining the first layer, the second layer, the plurality of functions, the connections between the first layer and the second layer, and a sequence of the first layer and the second layer in the unstandardized architecture diagram image comprises:

determining the first layer, the second layer, the plurality of functions, and the connections between the first layer and the second layer in the unstandardized architecture diagram image by performing a convolution operation on the unstandardized architecture diagram image;

generating a first matrix representing the first layer, the second layer, the plurality of functions, and the connections between the first layer and the second layer in the unstandardized architecture diagram image;

determining the sequence of the first layer and the second layer of the unstandardized architecture diagram image by performing a long short term memory (LSTM) operation on the first matrix;

generating a second matrix representing the first layer, the second layer, the plurality of functions, the connections between the first layer and the second layer, and the sequence of the first layer and the second layer in the unstandardized architecture diagram image; and performing a flattening operation on the second matrix to generate the first vector.

17. The computer program of claim 15, wherein determining features to depict the first layer, the second layer, the plurality of functions, and the connections between the first layer and the second layer in the standardized model image comprises:
  determining the first layer, the second layer, the plurality of functions, and the connections between the first layer and the second layer in the standardized model image by performing a convolution operation on the standardized model image;
  generating a third matrix representing the first layer, the second layer, the plurality of functions, and the connections between the first layer and the second layer in the unstandardized architecture diagram image;
  performing a flattening operation on the third matrix to generate the second vector.

18. The computer program of claim 15, wherein determining the standardized graphical representation of the unstandardized architecture diagram image comprises:
  performing a convolution with an upsampling operation on the third vector, wherein the upsampling operation unifies a size of the standardized graphical representation of the unstandardized architecture diagram image.

19. The computer program of claim 15, wherein the standardized graphical representation comprises:
  a first standardized layer comprising the first plurality of components depicted in a standardized format; and
  a second standardized layer comprising the second plurality of components depicted in a standardized format, wherein the plurality of functions is operated on the first plurality of components, the first standardized layer is connected to the second standardized layer.

20. The computer program of claim 15, wherein converting the plurality of functions into a corresponding braille symbol comprises:
  converting a first function into a first braille symbol using a mapping of functions to braille symbols stored in a memory; and
  converting a second function into a second braille symbol different from the first braille symbol using the mapping of functions to braille symbols.

* * * * *